United States Patent
Syré et al.

[11] Patent Number: 5,918,376
[45] Date of Patent: Jul. 6, 1999

[54] GLIDING PLATE

[75] Inventors: Hans-Richard Syré, Neuwied; Michael Wagner, Burgbrohl, both of Germany

[73] Assignee: Honeywell, Inc., Minneapolis, Minn.

[21] Appl. No.: 08/894,011

[22] PCT Filed: Feb. 13, 1996

[86] PCT No.: PCT/EP96/00601

§ 371 Date: Aug. 8, 1997

§ 102(e) Date: Aug. 8, 1997

[87] PCT Pub. No.: WO96/26412

PCT Pub. Date: Aug. 29, 1996

[30] Foreign Application Priority Data

Feb. 24, 1995 [DE] Germany .......................... 195 06 470

[51] Int. Cl.[6] .................................................. G01B 7/04
[52] U.S. Cl. ............................................................ 33/501.02
[58] Field of Search .......................... 33/501.02, 501.03, 33/549; 248/362; 360/102

[56] References Cited

U.S. PATENT DOCUMENTS

| | | | |
|---|---|---|---|
| 3,818,327 | 6/1974 | Alexander | 33/501.03 |
| 3,855,524 | 12/1974 | Crawford | 360/102 |
| 4,107,847 | 8/1978 | Typpo et al. | 33/501.02 |
| 4,901,445 | 2/1990 | Boissevain et al. | 33/501.02 |
| 5,063,682 | 11/1991 | Boissevain et al. | 33/501.02 |
| 5,075,979 | 12/1991 | Foskett | 33/501.02 |
| 5,479,720 | 1/1996 | Hellstrom et al. | 33/501.03 |

FOREIGN PATENT DOCUMENTS 394109  10/1990  European Pat. Off. ............ 33/501.02

*Primary Examiner*—G. Bradley Bennett
*Attorney, Agent, or Firm*—Anthony Miologos

[57] ABSTRACT

A sliding plate (16') is provided at its surface with grooves (38) expanding according to a V-shape with pressurized air being fed at the narrow end of the groove so that onto a material under test (12) guided via said sliding plate a suction force is exerted (FIG. 3b).

4 Claims, 3 Drawing Sheets

PRESSURIZED AIR

GLIDING PLATE

BACKGROUND OF THE INVENTION

The present invention relates to a sliding plate and more specifically to a sliding plate for guiding material under test that includes a Venturi device disposed to produce a suction force using pressurized air.

Such a sliding plate is preferably used to ascertain the thickness measurement of a moved material under test, such as a paper web, where the distance of a target, e.g. a ferrite core is located, on the material under test or floating on an air cushion, respectively. The ferrite core is sensed by means of an oscillator coil arranged below the material under test within a cut-out of the sliding plate so that a measurement of the thickness of the material under test results. In order to provide selected conditions of web trajectory as smooth as possible, the material under test is kept adjoining the sliding plate at its passage by means of a suction device. Herewith the suction device comprises a Venturi nozzle outside of the sliding plate, whereat the vacuum produced by the Venturi nozzle via hose pipes and bores is connected to the surface of the sliding plate. Such a device is taught by German Patent DE 37 29 318 C2. Herewith it has proved to be disadvantageous that via those bores and hose pipes not only air, but also dust is sucked-in. In order to prevent clogging, pressurized air therefor has been periodically fed in a reverse direction to the hose pipe and bores.

SUMMARY OF THE INVENTION

The present invention aims at a design of such a sliding plate in a manner where the problem of dust build-up, dust accumulation and clogging does not appear.

The solution of this object is achieved a sliding plate for guiding a material under test comprising a Venturi device for producing a suction force for the material under test by means of pressurized air. The Venturi device consists of at least one groove within the sliding plate with the groove having an expanding cross-section and being open to the material under test. Pressurized air is fed to the groove's narrow end and the groove's wider end is open at a side face of the sliding plate. Further advantageous embodiments of the inventive sliding plate and its use may be taken from the appended claims.

BRIEF DESCRIPTION OF THE DRAWINGS

With respect to the following description and attached drawing the invention shall be further explained.

DETAILED DESCRIPTION OF THE INVENTION

According to

Figure 1A:
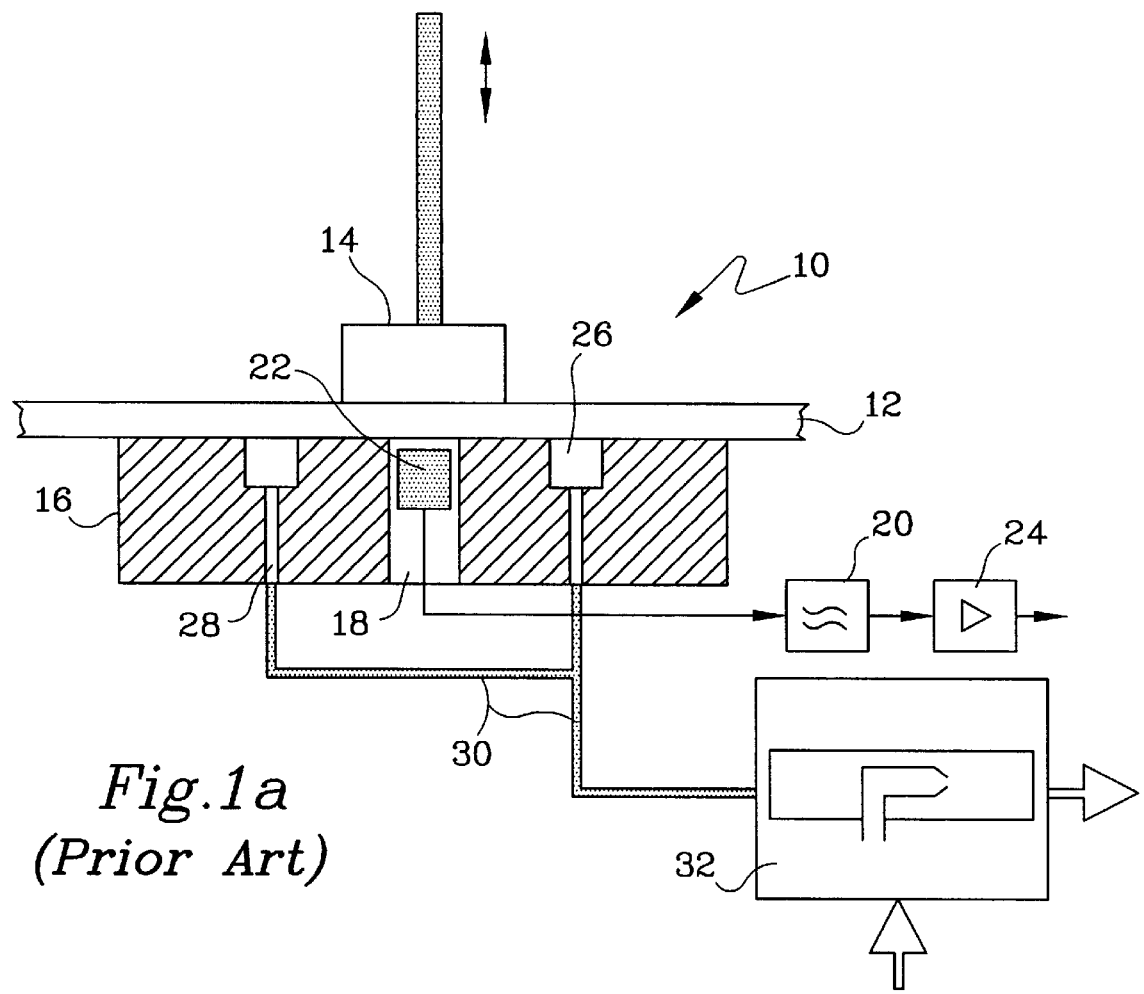
FIG. 1a the measuring device with a sliding plate according to the prior art.
Figure 1B:
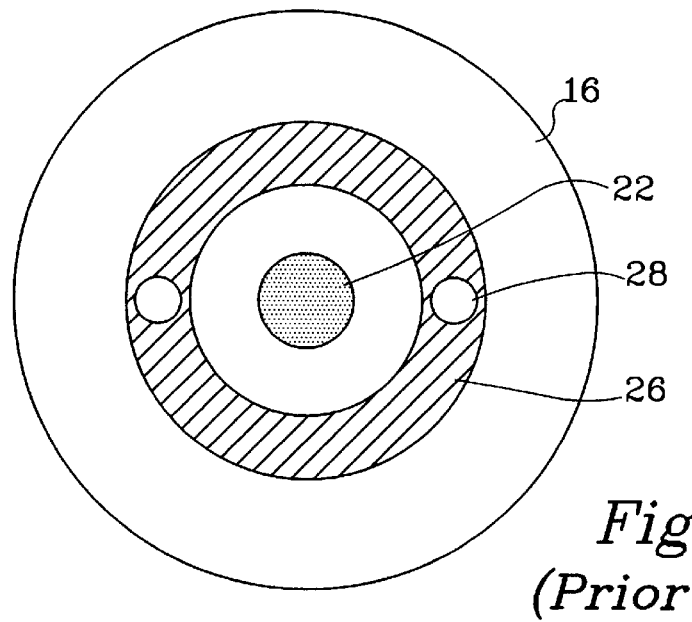
FIG. 1b a plane according to the prior art view onto the sliding plate.

FIG. 1a and FIG. 1b a known prior art fluid measuring device 10 for a moving material under test 12 comprises a ferrite body 14 abutting directly or by means of an air cushion the material under test 12. Below the material under test 12 a sliding plate 16 is arranged which comprises within a central bore 18 a measuring coil 22 which is driven by an oscillator 20. An evaluation electronics 24 providing the measuring signal is connected to the oscillator 20. Concentrically to the bore 16, an annular groove 26 is worked into the surface of the sliding plate 16, which groove by means of bores 28 and vacuum hoses 30 is connected to a device 32 which provides a vacuum within the annular groove 26 so that the material under test 12 is kept abutting the sliding plate 16 when moving along.

Figure 2:
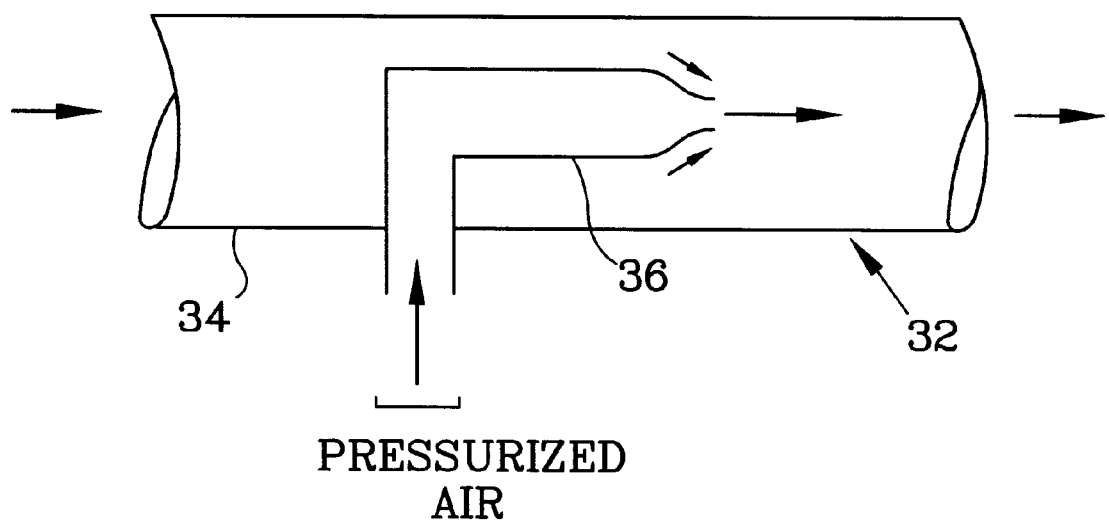
FIG. 2 a known device for producing a vacuum according to the prior art.

The vacuum producing means 32 according to FIG. 2 in a known prior art manner consists of a tube 34, into which a Venturi nozzle 36 is discharging in longitudinal direction, which nozzle is fed with pressurized air from a source of pressurized air (not shown) so that at the entrance side of the tube 34 a vacuum is produced.

Figure 3A:
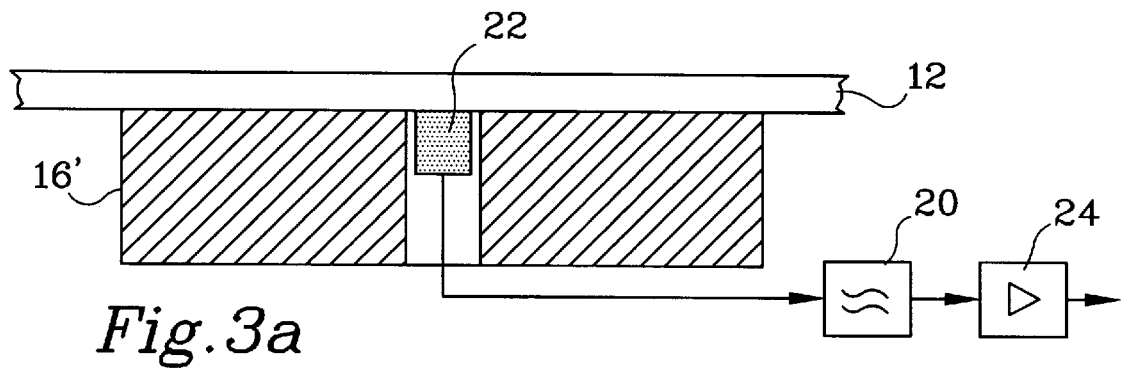
FIG. 3a a part of the measuring device with an inventive sliding plate.
Figure 3B:
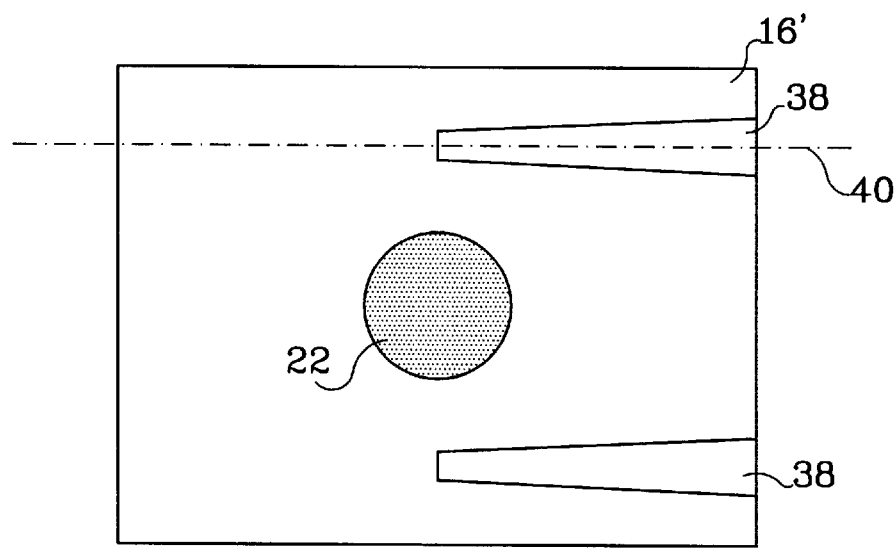
FIG. 3b a plane view onto the inventive sliding plate.
Figure 3C:
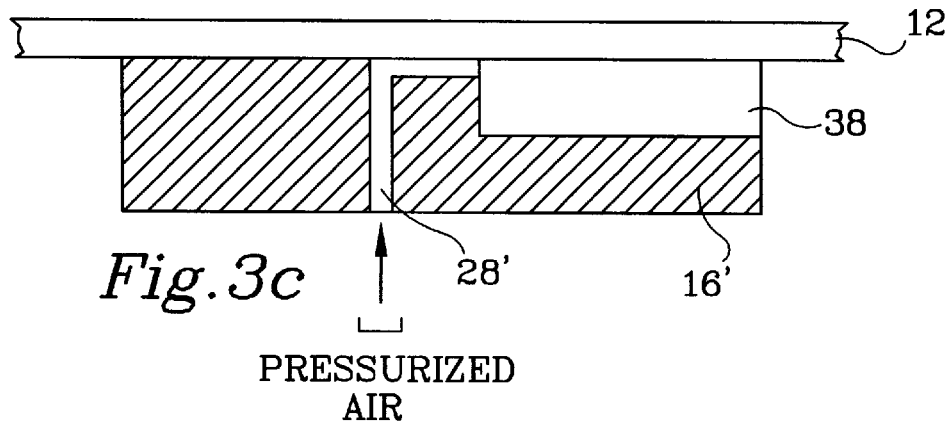
FIG. 3c a vertical section along line 40 in FIG. 3b through the inventive sliding plate.

According to the FIGS. 3a to 3c, a sliding plate 16' according to the invention is shown. Viewed from above two V-shaped grooves 38 are worked into said sliding plate 16', which grooves extend in the moving direction of the material under test 12 and which grooves are arranged on both sides of the measuring coil 22. The grooves 38 are connected to the pressurized air from a source of pressurized air (not shown) by means of bores 28'. Herewith the bores 28' are bent off at right angles so that they enter the grooves 38 at their front sides and at their narrowed ends. The expanded end of the groove 38 discharges to the side face of the sliding plate 16' so that pressurized air can escape at those spots. Together with the material under test 12 arranged above the grooves 38, those grooves in flow direction of the air form a duct with enlarging cross-section, which due to its configuration produces the Venturi effect and therefor the suction effect without existing any danger of clogging the duct by means of dust particles. Moveover, such dust particles are simply guided laterally away by the pressurized air through the duct 38.

It is obvious that instead of the two grooves described within the shown embodiment, any other number of grooves can be provided, whereat also the length of the grooves may vary.

The present invention has been described with particular reference to the preferred embodiments thereof. It will be obvious that various changes and modifications can be made therein without departing from the spirit and scope of the invention as defined in the appended claims.

We claim:

1. A sliding plate for guiding a material under test comprising:
   a Venturi device for producing a suction force for the material under test by means of pressurized air applied to said Venturi device from a source of pressurized air, the Venturi device consisting of at least one groove (38) within the sliding plate (16') with said groove having an expanding cross-section extending from narrow front end to a wider rear end and being open to the material under test (12) with said pressurized air being fed to its narrow front end, whereat the groove (38) wider rear end is open at a side face of the sliding plate.

2. The sliding plate according to claim 1, wherein the groove (38) extends in the direction of the movement of the material under test (12).

3. The sliding plate according to claim 2, wherein the groove expands according to a V-shape.

4. The sliding plate according to claim 3, wherein said sliding plate (16') includes a measuring device (22) inserted within said sliding plate, said sliding plate further including at least first and second grooves (38), whereby said measuring device is located in a spaced and symmetrical relationship between said first and second grooves.

* * * * *